(12) United States Patent
Wormser et al.

(10) Patent No.: US 6,322,884 B1
(45) Date of Patent: Nov. 27, 2001

(54) METHOD BONDING AN OPTICAL ELEMENT WITHIN AN ENCLOSURE

(75) Inventors: Daniel Wormser, Gedera; Joseph Morag, Rishon LeZion; Dan Slasky, Rehovot, all of (IL)

(73) Assignee: ELOP Electrio-Optics Industries Ltd. (IL)

( * ) Notice: Subject to any disclaimer, the term of this patent is extended or adjusted under 35 U.S.C. 154(b) by 0 days.

(21) Appl. No.: 09/500,431

(22) Filed: Feb. 9, 2000

(30) Foreign Application Priority Data

Feb. 9, 1999 (IL) .......................................................... 128450

(51) Int. Cl.[7] ...................................................... B32B 7/12
(52) U.S. Cl. ........................... 428/317.5; 385/39; 385/52; 385/102; 156/77; 156/291; 156/294
(58) Field of Search ............................. 428/317.5; 385/39, 385/52, 102; 156/77, 291, 294

(56) References Cited

U.S. PATENT DOCUMENTS

| 4,211,354 | * | 7/1980 | Hoffman et al. . |
| 5,306,915 | * | 4/1994 | Matthews . |
| 5,422,971 | * | 6/1995 | Honjo et al. . |
| 5,479,548 | * | 12/1995 | Cote et al. . |
| 5,790,731 | * | 8/1998 | Deveau . |
| 6,088,504 | * | 7/2000 | Filas et al. . |
| 6,134,360 | * | 10/2000 | Cheng et al. . |
| 6,195,372 | * | 2/2001 | Brown . |

FOREIGN PATENT DOCUMENTS

| 02064508-A | * | 3/1990 | (JP) . |
| 03271707-A | * | 12/1991 | (JP) . |
| 05157933-A | * | 6/1993 | (JP) . |
| 08029635-A | * | 2/1996 | (JP) . |
| 08304738-A | * | 11/1996 | (JP) . |
| 2000275479-A | * | 10/2000 | (JP) . |

* cited by examiner

Primary Examiner—Blaine Copenheaver
Assistant Examiner—Teresa M. O'Connor
(74) Attorney, Agent, or Firm—Connolly Bove Lodge & Hutz LLP

(57) ABSTRACT

The invention provides a method of bonding an optical element within an enclosure, the method comprising providing an optical element within an enclosure having interior walls configured and sized to surround the exterior walls of the optical element with clearance, so as to form a space therebetween; introducing into the space members having a cross-section substantially the same as the cross-section of the space at the locations of the members; filling the space with adhesive which does not adhere to the members, and removing the members, forming air-filled voids which cause the reduction of stress in the optical element when its temperature changes. The invention further provides an optical system to be used in the described method.

7 Claims, 1 Drawing Sheet

METHOD BONDING AN OPTICAL ELEMENT WITHIN AN ENCLOSURE

FIELD OF THE INVENTION

The present invention relates to a method of bonding an optical element within an enclosure, as well as to an optical system.

BACKGROUND OF THE INVENTION

The need to achieve adequate thermal distribution within an optical element such as a laser rod, necessitates encompassing the laser rod with a thermally conductive material, such as ceramic or sapphire. The thermally conductive material may be of cylindrical geometry, completely encompassing the rod or in the form of a hemisphere, where only half the rod is encompassed. The thermally conductive material is bonded to the rod by an optical adhesive which provides optical matching between the thermally conductive material and the rod. The adhesive also serves to thermally connect the rod and the thermally conductive material.

A problem arises, however, when the rod assembly undergoes variations in temperature; such variations cause the dissimilar materials of the optical element, thermally conductive material and optical adhesive to expand at different rates. When the temperature rises, high stresses are produced in the assembly which can cause the adhesive to fail, resulting in air pockets between the rod and the thermally conductive material. The air pockets result in an optical interference between the rod and the pump source. Moreover, the air pockets cause an increase in thermal resistance between the rod and the thermally conductive material, causing increased rod temperature. In addition, the stresses produced may result in the development of birefringence in the optical element, causing a change in the polarization vector of the beam. Furthermore, the stresses may be high enough to cause the eventual fracture of the optical element or thermally conductive material.

DISCLOSURE OF THE INVENTION

It is therefore a broad object of the present invention to ameliorate the above-described problems and to provide a method of binding an optical element to an enclosure so as to assure minimal stresses in the element when its temperature changes.

It is a further object of the present invention to provide an optical system assuring minimal stresses in the element when its temperature changes.

In accordance with the present invention, there is provided a method of bonding an optical element within an enclosure, said method comprising providing an optical element within an enclosure having interior walls configured and sized to surround the exterior walls of said optical element with clearance, so as to form a space therebetween; introducing into said space members having a cross-section substantially the same as the cross-section of said space at the locations of said members; filling said space with adhesive which does not adhere to said members, and removing said members, forming air-filled voids which cause the reduction of stress in said optical element when its temperature changes.

The invention further provides an optical system, comprising an optical element at least partly surrounded by a thermally conductive enclosure bonded thereto by an adhesive, characterized in that said adhesive is formed with air voids distributed about the element, to ensure minimal stresses in the element during use when its temperature changes.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION

Figure 1:
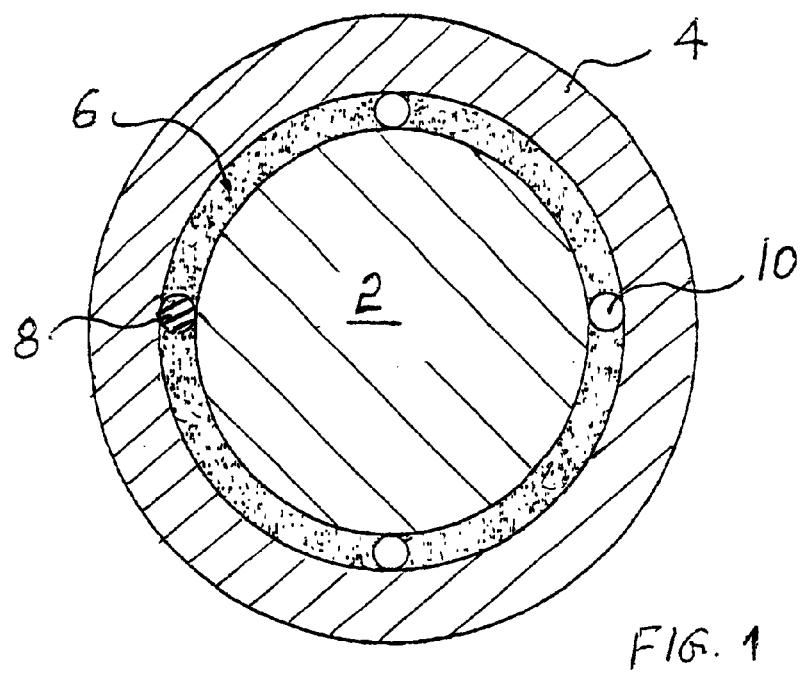
FIG. 1 is a schematic, cross-sectional view of an optical element bonded within an enclosure by the method according to the present invention.
Figure 2:
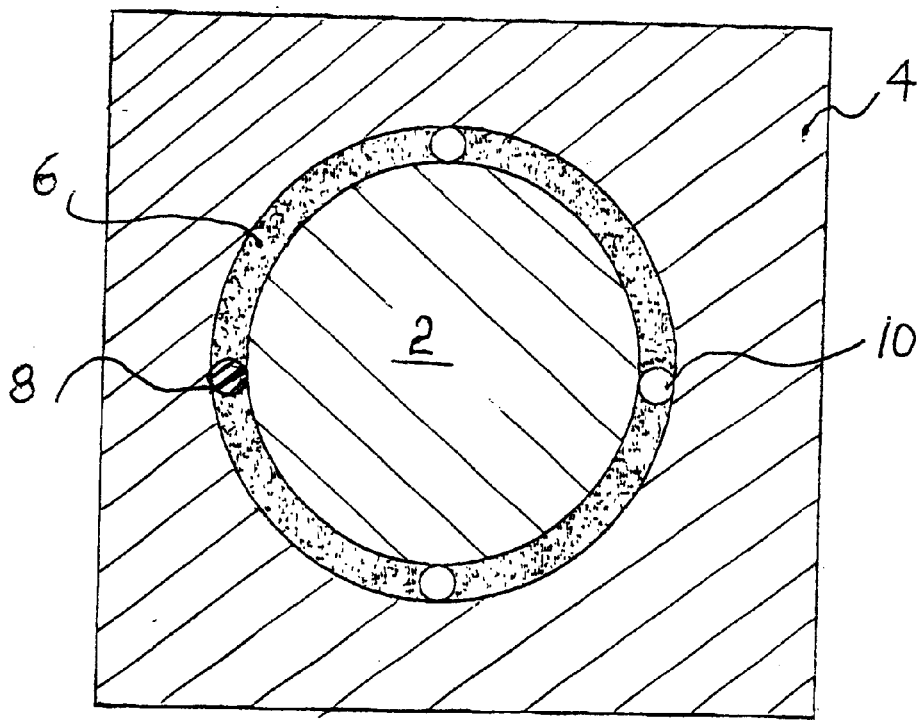
FIG. 2 is a schematic, cross-sectional view of a different embodiment of an optical element bonded within an enclosure according to the present invention.

In FIGS. 1 and 2, there is illustrated an optical element 2, such as a laser rod, surrounded or at least partly surrounded along its length by an enclosure 4 having a circular cross-section (FIG. 1) or a square cross-section (FIG. 2), and being made of thermally conductive material such as sapphire, ceramic, glass or the like. The optical element 2 and the enclosure 4 are bonded by an optical adhesive 6, such as silicon-based or UV-type adhesive, to achieve a good thermal connection and optical matching between the optical element and the thermally conductive enclosure 4.

The method of bonding the optical element 2 to the enclosure 4 is as follows:

The optical element 2, at least partly surrounded by the enclosure 4, is fitted with a predetermined number of members 8, e.g., thin wires, extending along the optical element 2 in angularly spaced-apart disposition, preferably equidistant about the circumference of the element. The members 8 are of a material which does not bond to the optical adhesive 6, e.g., Teflon-coated metallic members, nylon wires, or the like, of any suitable configuration. The wires are placed in predetermined positions along the circumference of the optical element with the aid of an apparatus designed to ensure their correct placement. For example, for an optical element having a diameter of 2.5 mm and an adhesive thickness of 0.3 mm, it is recommended to use four wires.

The entire system, namely, the optical element 2, the enclosure 4 and the members 8, can then be placed in a vacuum chamber while sealing off one end with an adhesive. The bonding process between the optical element 2 and the enclosure 4, with the wires embedded in the optical adhesive, inside a vacuum chamber, results in a more uniform bonding free of air bubbles. After the completion of the bonding process, including setting time, etc., the wires are removed by pulling them out from the assembly, resulting in the formation of air gaps or voids 10 along the bonded surface. At high temperatures, the adhesive expands into these air voids, which thus serve as a volume compensatory for the adhesive. The result is a drastic reduction of birefringence and eliminates the danger of fracture of the optical element or thermally conductive material. The diameter of the air voids is small and their location can be positioned to cause minimal optical interference between the pump source and the rod. In addition, due to the small size of the air voids, the thermal distribution within the optical element is not distorted.

Alternatively, the optical element 2 and the enclosure 4 may first be placed in a vacuum chamber and only then fitted with the wires 8 and stuffed with the adhesive 6.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method of bonding an optical element within an enclosure, said method comprising:

providing an optical element within an enclosure having interior walls configured and sized to surround the exterior walls of said optical element with clearance, so as to form a space therebetween;

introducing into said space members having a cross-section substantially the same as the cross-section of said space at the locations of said members; filling said space with adhesive which does not adhere to said members, and removing said members, forming air-filled voids which cause the reduction of stress in said optical element when its temperature changes.

2. The method as claimed in claim 1, wherein said members are in the form of wires which are removed by pulling them out of the adhesive after setting.

3. The method as claimed in claim 1, wherein said adhesive is introduced in said space under vacuum.

4. The method as claimed in claim 1, wherein said optical element and at least the inside surface of said enclosure are angularly spaced apart equidistant from each other within said space.

5. An optical system, comprising:

an optical element at least partly surrounded by a thermally conductive enclosure bonded thereto by an adhesive, wherein said adhesive is formed with air voids distributed about the element, to ensure minimal stresses in the element during use when its temperature changes.

6. The optical system as claimed in claim 5, wherein said air voids are distributed in spaced-apart relationship around said optical element.

7. The optical system as claimed in claim 5, wherein at least some of said air voids substantially extend between the interior surface of said enclosure and the exterior surface of said optical element, so as to form gaps in the adhesive bonding said enclosure to said optical element.

* * * * *

UNITED STATES PATENT AND TRADEMARK OFFICE
CERTIFICATE OF CORRECTION

PATENT NO. : 6,322,884 B1
DATED : December 25, 2001
INVENTOR(S) : Kevin Cooper

It is certified that error appears in the above-identified patent and that said Letters Patent is hereby corrected as shown below:

Column 10,
Line 10, please delete "," and insert therefore -- of --

Signed and Sealed this

Thirteenth Day of January, 2004

JON W. DUDAS
*Acting Director of the United States Patent and Trademark Office*